(No Model.)

L. RUBEL.
EYEGLASSES.

No. 459,234.  Patented Sept. 8, 1891.

WITNESSES:

INVENTOR
L. Rubel.
BY
ATTORNEYS.

UNITED STATES PATENT OFFICE.

LEONHARD RUBEL, OF NEW YORK, N. Y.

EYEGLASSES.

SPECIFICATION forming part of Letters Patent No. 459,234, dated September 8, 1891.

Application filed April 25, 1891. Serial No. 390,416. (No model.)

*To all whom it may concern:*

Be it known that I, LEONHARD RUBEL, a citizen of the United States, residing at New York city, in the county of New York and State of New York, have invented certain new and useful Improvements in Eyeglasses; and I do declare the following to be a full, clear, and exact description of the invention.

This invention relates to certain improvements in eyeglasses, whereby the same are held securely on the bridge of the nose without annoyance to the wearer; and the invention consists of a pair of eyeglasses the frames of which are connected by a transverse piece provided with a nose-bridge made integral therewith and with holding-pads back of said bridge, which pads are attached to arms fulcrumed to the nose-piece and acted upon by a spring at their inner ends, so as to adapt themselves to the size of the nose.

Figure 1:
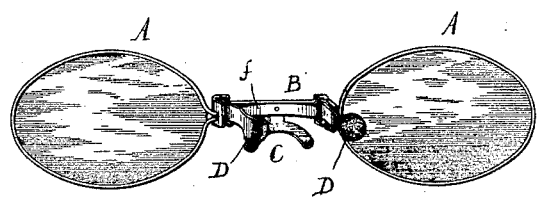
Figure 2:
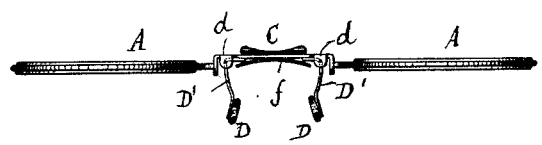
Figure 3:
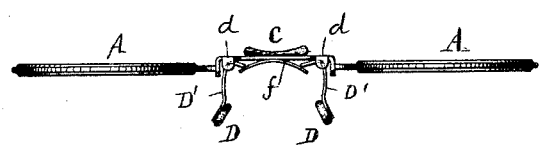
Figure 4:
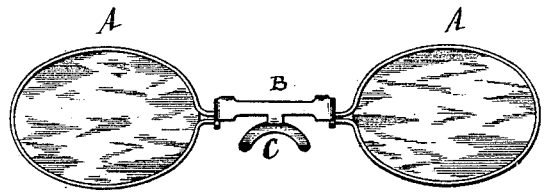

In the accompanying drawings, Figure 1 represents a perspective view of my improved eyeglasses, taken from the rear of the same. Figs. 2 and 3 are plans showing the same, respectively, before and after application to the nose; and Fig. 4 is a front elevation of the eyeglasses.

Similar letters of reference indicate corresponding parts.

In the drawings, A represents a pair of eyeglasses the frames of which are connected by a transverse piece B, below which is arranged a curved nose-rest C, that extends centrally from the transverse piece B and is attached thereto or made integral therewith.

In addition to the nose-rest C the eyeglasses are provided with cushioning-pads D D, which are arranged back of the transverse piece B and applied to the rear ends of fulcrumed elbow-shaped arms D', that are pivoted to ears d, that are bent up from the transverse piece B. The inwardly-extending portions of the arms D' extend beyond the pivots of the arms and are acted upon by a flat spring f, which is riveted to the rear of the transverse piece B.

The cushioning-pads D are preferably made of cork, chamois-leather, or other suitable elastic material, so as to press lightly and conveniently on the sides of the nose-bridge, so that the eyeglasses are held at three points—at the front of the nose-bridge by the curved rest C and at both sides of the same by the cushioning-pads D. The tension of the spring f and the distance of the pads D from each other are adjusted to the size of the nose-bridge, so that the glasses fit easily, yet snugly, to the nose without being liable to drop off or change their position thereon.

Having thus described my invention, I claim as new and desire to secure by Letters Patent—

1. In a pair of eyeglasses, the combination, with the glasses, of a transverse piece having a curved rest, and cushioning-pads applied to the rear ends of fulcrumed and spring-actuated arms pivoted to the transverse piece, substantially as set forth.

2. In a pair of eyeglasses, the combination of the glasses with a transverse piece having a curved rest below the same made integral with the transverse piece or attached thereto, lever-arms fulcrumed to said transverse piece and provided with cushioning-pads at their rear ends, and a flat spring pressing on the inner ends of the fulcrumed arms, substantially as set forth.

In testimony whereof I affix my signature in presence of two witnesses.

LEONHARD RUBEL.

Witnesses:
CHARLES SCHROEDER,
A. M. BAKER.